United States Patent
Lin et al.

(10) Patent No.: US 7,507,068 B2
(45) Date of Patent: Mar. 24, 2009

(54) HEAT-DISSIPATING MECHANISM FOR A MOTOR

(75) Inventors: Yu-Chih Lin, Taoyuan Hsien (TW); Huan-Chi Chen, Taoyuan Hsien (TW); Te-Tsai Chuang, Taoyuan Hsien (TW); Wen-Shi Huang, Taoyuan Hsien (TW)

(73) Assignee: Delta Electronics, Inc., Taoyuan Hsien (TW)

( * ) Notice: Subject to any disclaimer, the term of this patent is extended or adjusted under 35 U.S.C. 154(b) by 284 days.

(21) Appl. No.: 11/312,451

(22) Filed: Dec. 21, 2005

(65) Prior Publication Data
US 2006/0233643 A1 Oct. 19, 2006

(30) Foreign Application Priority Data
Apr. 18, 2005 (TW) .............................. 94112193 A

(51) Int. Cl.
*F04D 29/58* (2006.01)
(52) U.S. Cl. ................ 415/176; 417/423.8; 416/201 R; 416/203
(58) Field of Classification Search ................ 415/176, 415/180, 220, 211.2, 191; 310/58, 59, 62, 310/63, 60 A; 417/423.8; 416/201 R, 203
See application file for complete search history.

(56) References Cited

U.S. PATENT DOCUMENTS

| 4,210,833 | A | * | 7/1980 | Neveux ........................ 310/58 |
| 4,838,760 | A | * | 6/1989 | Brackett ................... 416/93 R |
| 5,944,497 | A | * | 8/1999 | Kershaw et al. .......... 417/423.8 |
| 6,220,207 | B1 | * | 4/2001 | Kawasaki et al. ......... 123/41.11 |
| 6,384,494 | B1 | * | 5/2002 | Avidano et al. ............... 310/58 |
| 7,244,110 | B2 | * | 7/2007 | Hong et al. .................. 417/368 |
| 2005/0207888 | A1 | * | 9/2005 | Kashiwazaki et al. ....... 415/206 |

* cited by examiner

*Primary Examiner*—Ninh H Nguyen
(74) *Attorney, Agent, or Firm*—Birch, Stewart, Kolasch & Birch, LLP

(57) ABSTRACT

A heat-dissipating mechanism for a motor includes a rotor and a stator base. The rotor rotates with respect to the stator base and includes a casing and a hub. The casing has a side portion and a bottom portion, and at least one opening is disposed at the bottom portion. The hub is disposed on the casing, for preventing an external particle from entering the rotor. The hub includes a plurality of separation ribs and when the hub is disposed on the casing, a heat-dissipating passage is formed between every two adjacent separation ribs and the side portion of the casing.

20 Claims, 6 Drawing Sheets

HEAT-DISSIPATING MECHANISM FOR A MOTOR

This Non-provisional application claims priority under U.S.C. § 119(a) on Patent Application No(s). 094112193 filed in Taiwan, Republic of China on Apr. 18, 2005, the entire contents of which are hereby incorporated by reference.

BACKGROUND

The invention relates to a heat-dissipating mechanism for a motor, and in particular to a heat-dissipating mechanism for a motor applied to a fan.

Motors are commonly used in various fields. For example, motors are often disposed in fans to assist in heat dissipation. The fans can be roughly classified as centrifugal and axial-flow types. Motors enable rotation of blades of both the centrifugal and axial-flow fans, achieving active heat dissipation.

FIG. 1A is a schematic perspective view of a conventional centrifugal fan 10a. In the centrifugal fan 10a, a rotor 12a is driven by a motor inside thereof (not shown) and multiple blades 14a are connected to the rotor 12a. When the rotor 12a rotates, the blades 14a connected thereto rotate accordingly, circulating air and thereby achieving heat dissipation.

FIG. 1B is a schematic perspective view of a conventional axial-flow fan 10b. Similarly, in the axial-flow fan 10b, a rotor 12b is driven by a motor (not shown) and multiple blades 14b are connected to the rotor 12b. When the rotor 12b rotates, the blades 14b connected thereto rotate accordingly, circulating air and thereby achieving active heat dissipation. Additionally, the axial-flow fan 10b includes a fan frame 16b, providing more concentrated airflow and enhancing heat dissipation.

Nevertheless, during the operation of the aforementioned fans, heat is inevitably generated in the rotors due to high-speed rotation and heat generally accumulates in the rotors. When the fans operate over a long period of time, the motors thereof are easily damaged due to high temperature caused by the heat accumulated in the rotors. The lifespan of the fans is thus reduced.

To overcome the aforementioned problems, other conventional centrifugal and axial-flow fans are disclosed. FIG. 1C is a schematic perspective view of another conventional centrifugal fan 10c. FIG. 1D is a schematic perspective view of another conventional axial-flow fan 10d. Similarly, in the centrifugal fan 10c, a rotor 12c is driven by a motor (not shown) and multiple blades 14c are connected to the rotor 12b. When the rotor 12c rotates, the blades 14c connected thereto rotate accordingly, achieving active heat dissipation. Specifically, a plurality of openings 18c is formed on the rotor 12c. When the rotor 12c rotates, hot air within the rotor 12c can be discharged via the openings 18c. Therefore, heat does not accumulate in the rotor 12c and does not cause damage to the motor. Similarly, in the axial-flow fan 10d, a rotor 12d is driven by a motor (not shown) and multiple blades 14d are connected to the rotor 12d. Additionally, a plurality of openings 18d is formed on the rotor 12d, and the rotor 12d and blades 14d are disposed within a fan frame 16d. When the rotor 12d rotates, the blades 14d connected thereto rotate accordingly. Heat generated by the rotor 12d is discharged via the openings 18d and does not accumulate therein the rotor 12d.

Although the heat generated by the rotors can be discharged via the openings, external particles, dust or moisture also enter the rotors via the openings. When the centrifugal fan 10c and axial-flow fan 10d operate, dust, minute particles or moisture can easily enter the rotors 12c and 12d via the openings 18c and 18d, respectively. As the result, the rotating shafts of the motors may be obstructed by the external particles and the motors thereby damaged.

SUMMARY

Accordingly, an embodiment of the invention provides a heat-dissipating mechanism for a motor, reducing temperature thereof and enhancing efficiency thereof when the motor is in operation.

Moreover, an embodiment of the invention provides a heat-dissipating mechanism for a motor to enable forced air circulation and convection in the outer rotor thereof. Heat in the outer rotor is discharged and does not accumulate therein. The lifespan of the motor is thus prolonged. Further, the heat-dissipating mechanism prevents an external particle from entering the outer rotor of the motor.

Accordingly, an embodiment of the invention provides a heat-dissipating mechanism for a motor, including a stator base and a outer rotor. The outer rotor rotates with respect to the stator base and includes a casing and a hub. The casing includes a side portion and a bottom portion having at least one opening disposed at the bottom portion. The hub mounts around and is disposed on the casing, for preventing external particles from entering the outer rotor. The hub includes a plurality of separation ribs. When the hub is disposed on the casing, a heat-dissipating passage is between every two of the adjacent separation ribs and the side portion of the casing. When the outer rotor rotates, hot air within the outer rotor is discharged out of the casing by passing through the opening and flowing via the heat-dissipating passage.

The hub further includes an inner side surface and an inner bottom surface connected thereto. The hub further includes a curved top surface which is opposite to the inner bottom surface. The separation ribs are disposed on the inner side surface. The hub further includes an auxiliary static blade portion disposed on the inner bottom surface of the hub, and one end of each separation rib is connected to the auxiliary static blade portion. The auxiliary static blade portion includes a plurality of radially arranged guiding blades. The separation ribs and guiding blades are integrally formed with the hub. The hub and the casing are shaped as a cylindrical profile.

The heat-dissipating mechanism is applied to a fan and further includes a plurality of blades connected to the hub, and the blades are obliquely extended from a side wall of the hub, respectively. The blades rotate with the outer rotor. The blades include centrifugal or axial-flow blades. Additionally, the heat-dissipating mechanism further includes a fan frame surrounding the hub and the blades. Further, there are a plurality of inclined elements disposed between the stator base and an inner wall of the frame.

DESCRIPTION OF THE DRAWINGS

The invention can be more fully understood by reading the subsequent detailed description and examples with references made to the accompanying drawings, wherein.

DETAILED DESCRIPTION

Figure 1A:
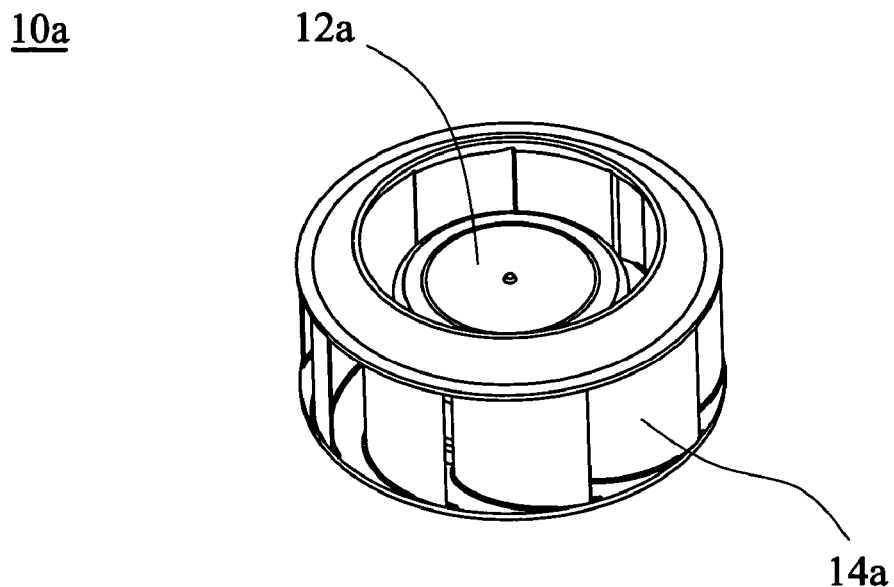
FIG. 1A is a schematic perspective view of a conventional centrifugal fan.
Figure 1B:
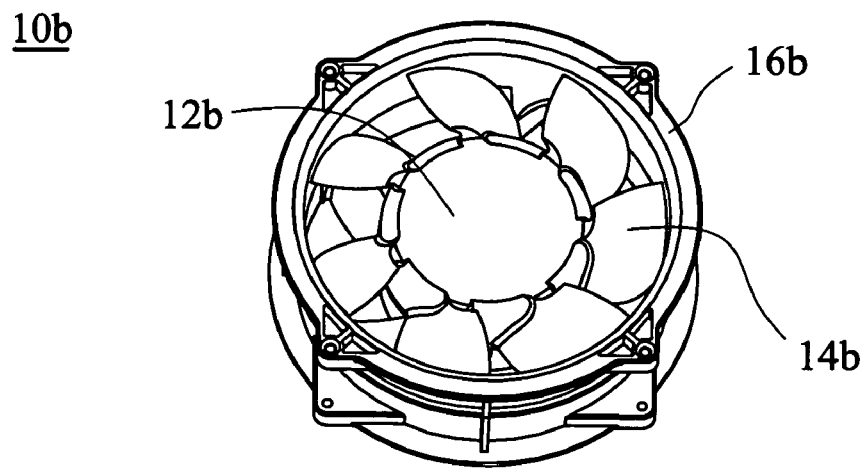
FIG. 1B is a schematic perspective view of a conventional axial-flow fan.
Figure 1C:
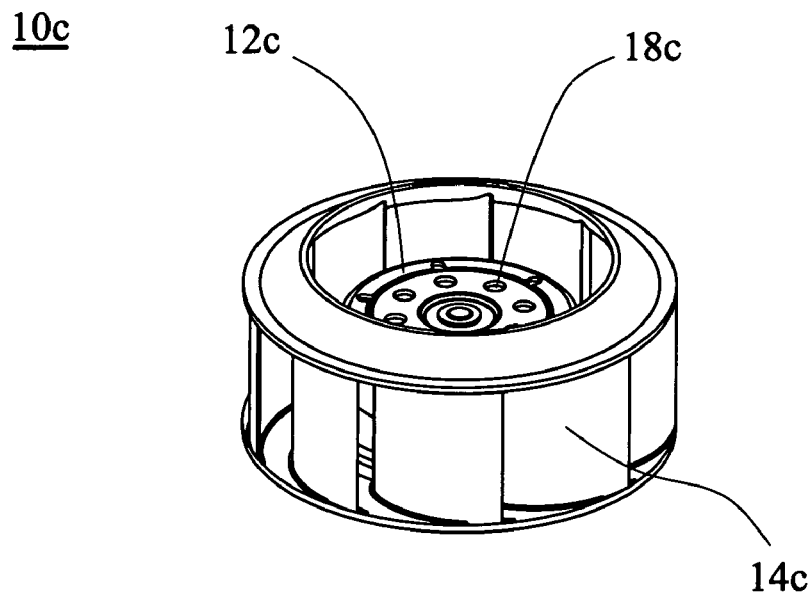
FIG. 1C is a schematic perspective view of another conventional centrifugal fan.
Figure 1D:
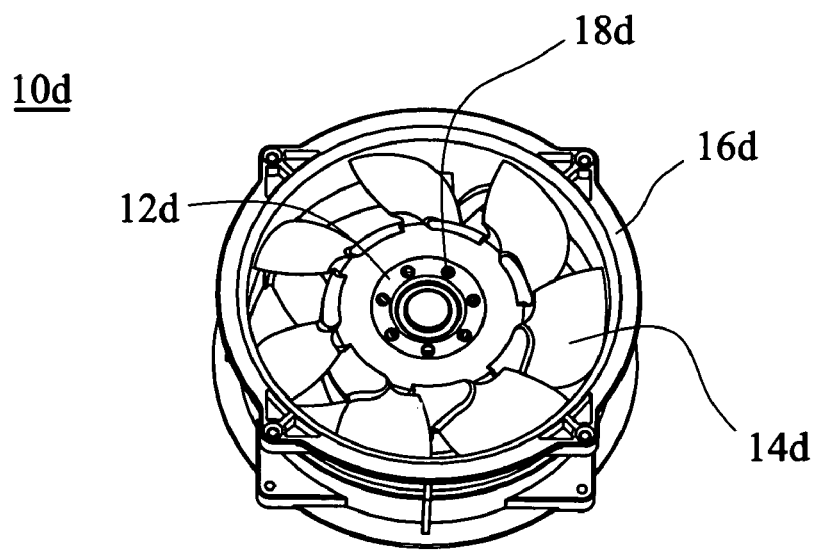
FIG. 1D is a schematic perspective view of another conventional axial-flow fan.
Figure 2A:
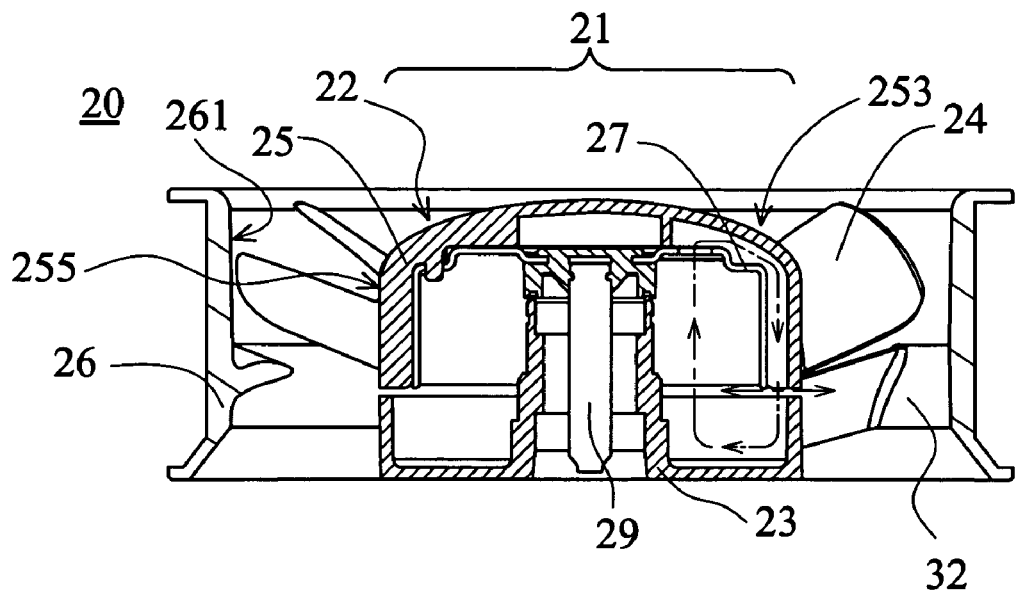
FIG. 2A is a cross section of the heat-dissipating mechanism for a motor applied to a fan of according to an embodiment of the invention.
Figure 2B:
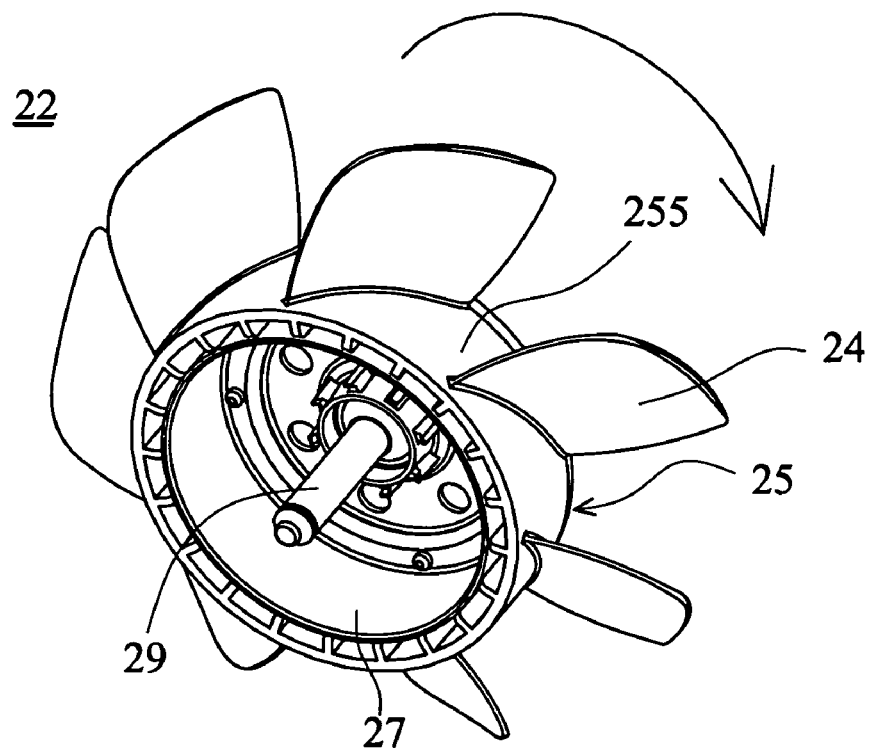
FIG. 2B is a schematic perspective view of the outer rotor of FIG. 2A.

Referring to FIG. 2A and FIG. 2B, a heat-dissipating mechanism 21 for a motor is applied to an axial-flow fan 20 having a fan frame 26. The heat-dissipating mechanism 21 includes a stator base 23 and an outer rotor 22, both disposed within the fan frame 26. The frame 26 surrounds the hub 25 and the blades 24, and there are a plurality of inclined elements 32 disposed between the stator base 23 and an inner wall 255 of the frame 26. The outer rotor 22 rotates with respect to the stator base 23 by means of a rotating shaft 29 disposed in the stator base 23. The outer rotor 22 includes a hub 25 and a casing 27 and the hub 25 mounts around and is disposed on the casing 27. There are many axial-flow blades 24 connected to the periphery of the hub 25. When the outer rotor 22 rotates, the axial-flow blades 24 rotate accordingly. In addition, referring both to FIG. 2A and FIG. 2B, the blades 24 are obliquely extended from a side wall of the hub 25, respectively.

Figure 2C:
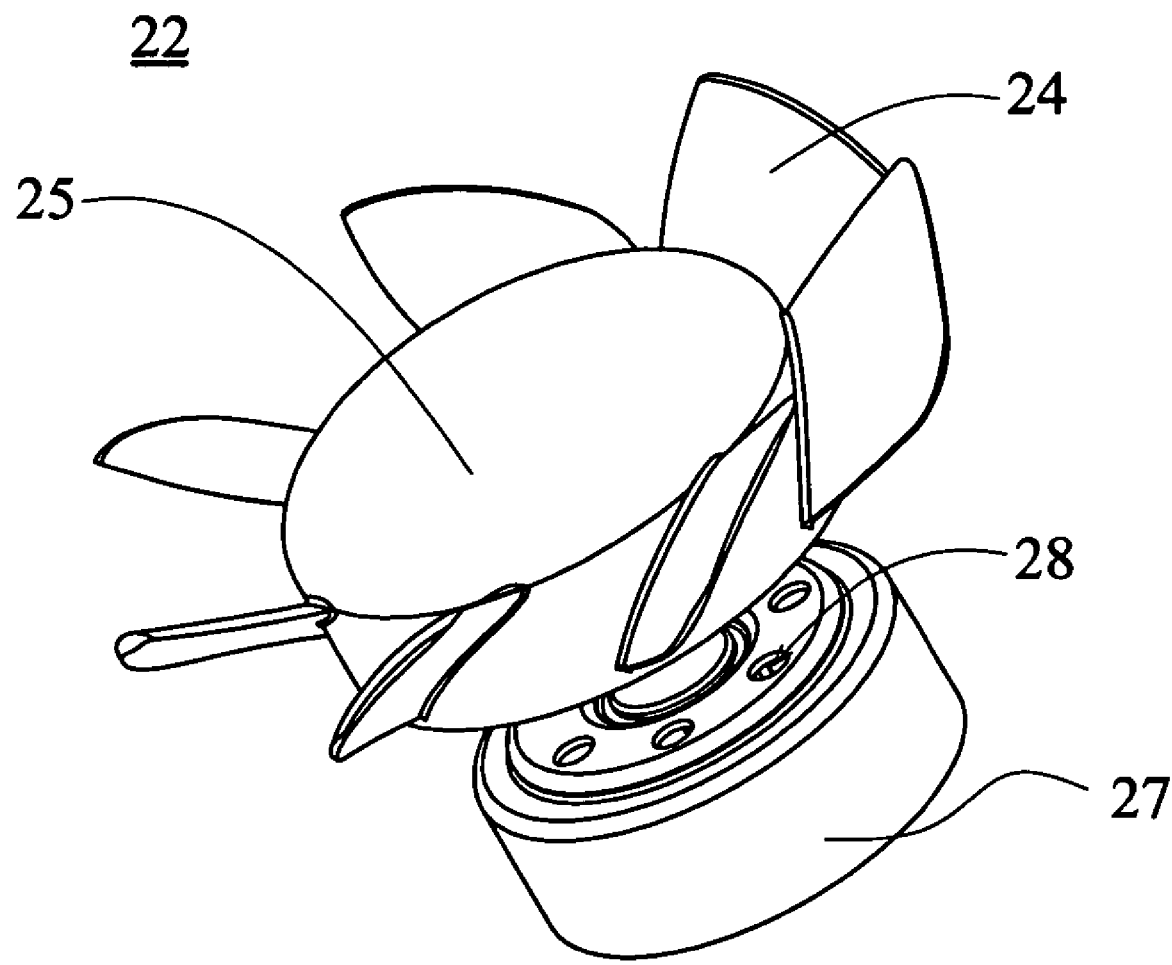
FIG. 2C is an exploded perspective view of FIG. 2B.
Figure 2D:
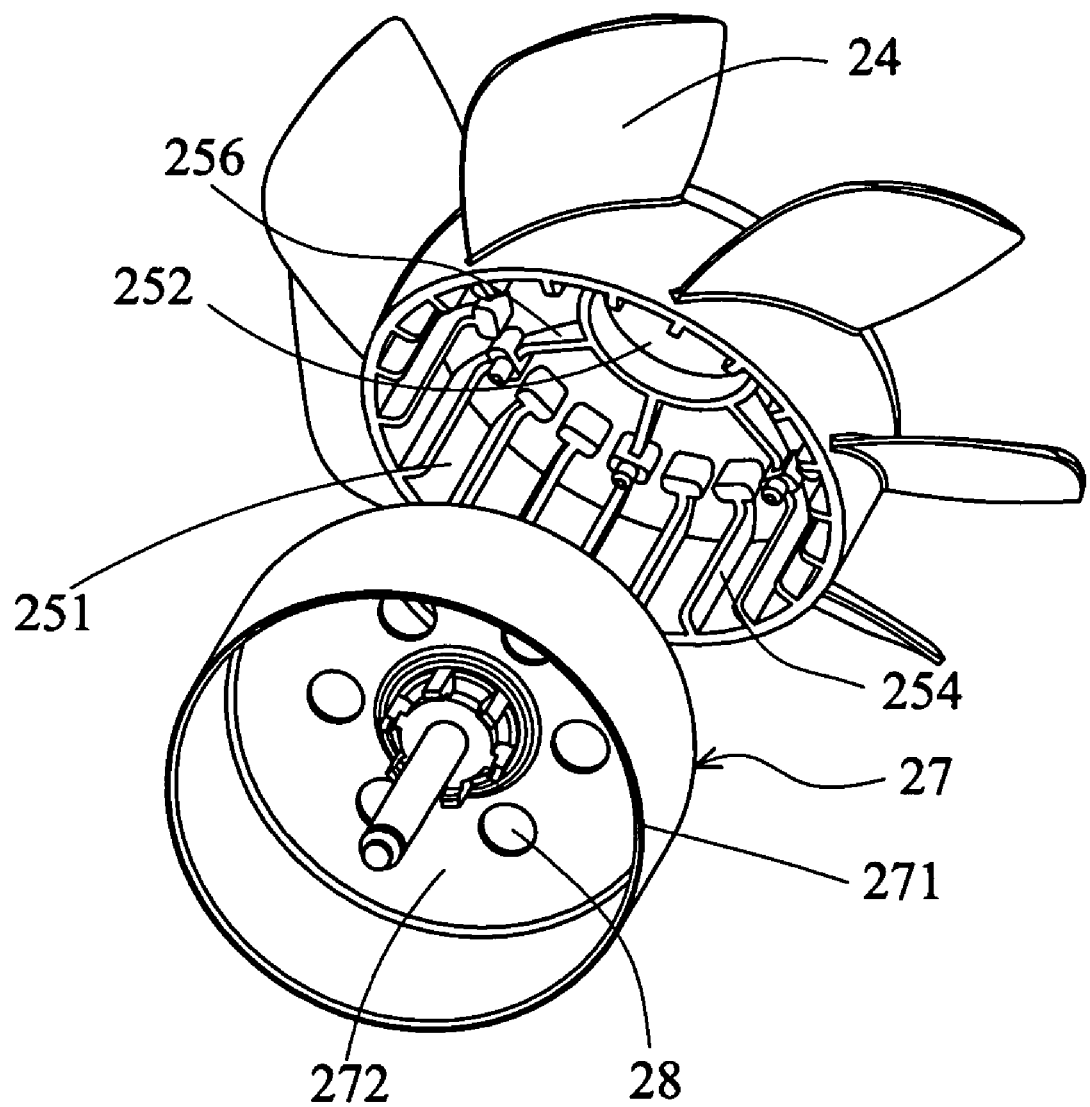
FIG. 2D is another exploded perspective view of FIG. 2B.

Referring to FIG. 2C and FIG. 2D, the hub 25 has an inner side surface 251 and an inner bottom surface 252 connected thereto and is shaped as a cylindrical profile. Also, the casing 27 has a side portion 271 and a bottom portion 272 and is shaped as a cylindrical profile with respect to the hub 25, so as to allow the hub 25 to mount around and be disposed on the casing 27.

There is at least one openings 28 formed on the bottom 272 of the casing 27. The hub 25 has a plurality of separation ribs 254 disposed on the inner side surface 251 of the hub 25. When the hub 25 fits on the casing 27, the separation ribs 254 of the hub 25 directly contact the side portion 271 of the casing 27 so that a heat-dissipating passage is formed between every two adjacent separation ribs 254 and the side portion 271. That is, the heat-dissipating passages formed by the adjacent separation ribs 254 and the side portion 271 of the casing 27 are circumferentially spaced by the separation ribs 254, and the heat-dissipating passages formed by the adjacent separation ribs 254 and the side portion 271 of the casing 27 are straight passages extended in a longitudinal direction with respect to the hub 25. When the outer rotor 22 rotates, hot air within the outer rotor 22 is discharged out of the casing 27 by passing the openings 28 and flowing via the heat-dissipating passage, such that heat does not accumulate within the outer rotor 22 and the lifespan of the motor is not reduced. Moreover, as the hub 25 completely and directly mounts around and is disposed on the casing 27, external particles cannot enter the outer rotor 22 via the openings 28. In addition, both referring to FIG. 2A and FIG. 2D, the hub 25 further includes a curved top.

Figure 3:
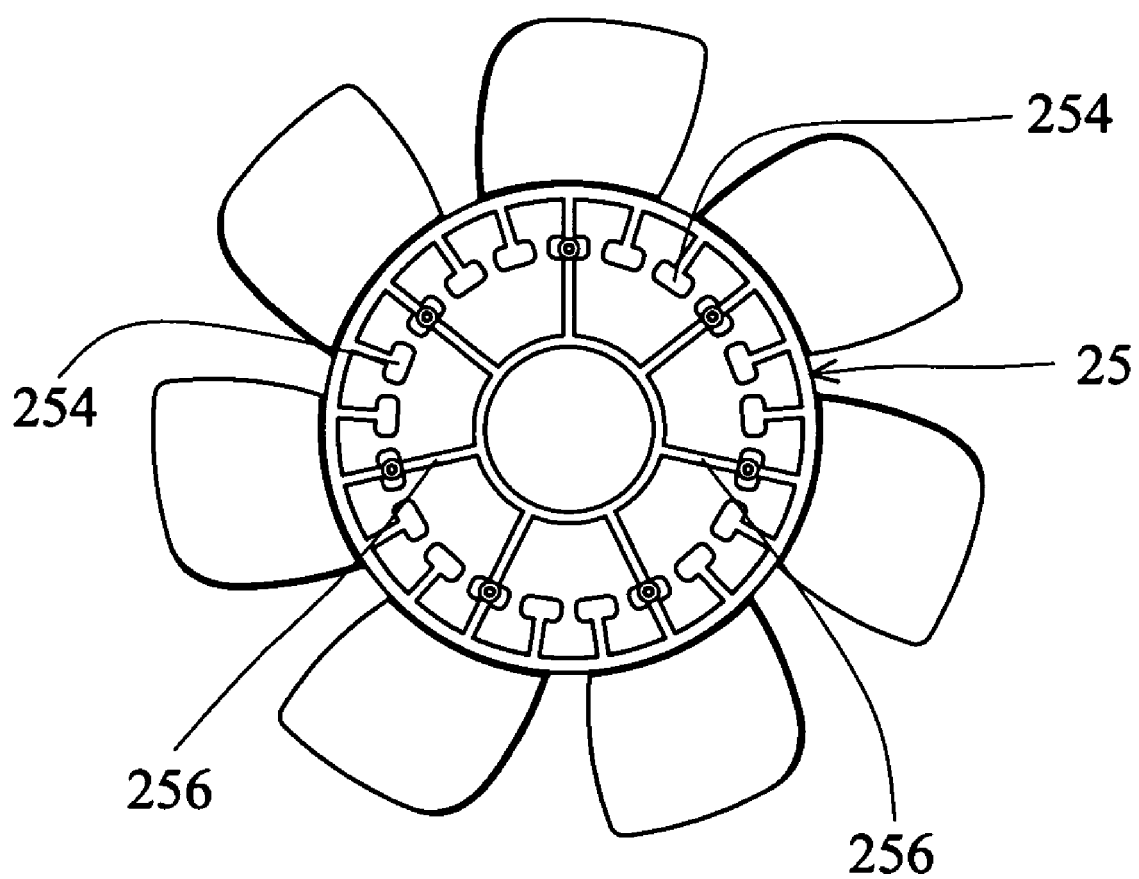
FIG. 3 is a schematic bottom view of the hub of FIG. 2D.

As shown in FIG. 2D and FIG. 3, the hub 25 further includes an auxiliary static blade portion disposed on the inner bottom surface 252 of the hub 25. The auxiliary static blade portion has a plurality of radially arranged guiding blades 256, and one end of each separation rib 254 is connected to the auxiliary static blade portion, thereby guiding air at the auxiliary static blade portion into the heat-dissipating passage between every two of the adjacent separation ribs 254 and the side portion 271. Moreover, the separation ribs 254 and the guiding blades 256 can be additionally disposed on the inner side surface 251 and inner bottom surface 252 of the hub 25 or integrally formed with the hub 25 as a single piece.

When the outer rotor 22 rotates at high speed, the radially arranged guiding blades 256 work like rotating blades to form an environment with negative pressure. Thus, hot air within the casing 27 passes through the openings 28 and reaches the auxiliary static blade portion at the inner bottom surface 252 of the hub 25. The hot air is then rapidly discharged by flowing via the heat-dissipating passage due to centrifugal force generated by high-speed rotation of the guiding blades 256. In another aspect, cold or cooled air enters the outer rotor 22. Accordingly, forced air circulation and convection is continuously performed within the outer rotor 22. As the result, heat generated by the outer rotor 22 is continuously discharged and does not accumulate in a regional area within the outer rotor 22.

The heat-dissipating mechanism of this embodiment is applied to an axial-flow fan and forced air circulation and convection is continuously generated in the outer rotor of the motor of the axial-flow fan. The heat in the outer rotor can be discharged and does not accumulate within the outer rotor, such that the lifespan of the motor of the axial-flow fan is not reduced. Moreover, the hub completely and directly mounting around the casing can prevent external particles from entering the outer rotor. Specifically, the heat-dissipating mechanism is not limited to application of the axial-flow fan. For example, the heat-dissipating mechanism can selectively be applied to a centrifugal fan (not shown), and operation of the outer rotor is the same as that in the axial-flow fan. Additionally, the fan frame of the axial-flow fan can concentrate airflow, enhancing efficiency of heat dissipation of the motor of the axial-flow fan. Furthermore, the invention is not limited to application of the motors of fans. Namely, the heat-dissipating mechanism of the invention can be applied to various motors, as well achieving forced heat dissipation and prolonging the lifespan of the motors.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A heat-dissipating mechanism for a motor, comprising:
a stator base; and
an outer rotor, rotating with respect to the stator base and comprising:
  a casing, comprising a side portion, a bottom portion, and at least one opening; and
  a hub mounting around and disposed on the casing, for preventing an external particle from entering the outer rotor;
wherein the hub comprises a plurality of separation ribs, and when the hub is disposed on the casing, the separation ribs of the hub are contacted with the casing such that a heat-dissipating passage is formed between every two adjacent separation ribs and the side portion of the casing.

2. The heat-dissipating mechanism for a motor as claimed in claim 1, wherein, when the outer rotor rotates, hot air within the outer rotor is discharged out of the casing by passing through the opening and flowing via the heat-dissipating passage.

3. The heat-dissipating mechanism for a motor as claimed in claim 2, wherein the hub further comprises an inner side surface and an inner bottom surface connected thereto, and the separation ribs are disposed on the inner side surface.

4. The heat-dissipating mechanism for a motor as claimed in claim 3, wherein the hub further comprises a curved top surface which is opposite to the inner bottom surface.

5. The heat-dissipating mechanism for a motor as claimed in claim 3, wherein the hub further comprises an auxiliary static blade portion disposed on the inner bottom surface of the hub, and one end of each separation rib is connected to the auxiliary static blade portion.

6. The heat-dissipating mechanism for a motor as claimed in claim 5, wherein the auxiliary static blade portion comprises a plurality of guiding blades arranged radially.

7. The heat-dissipating mechanism for a motor as claimed in claim 6, wherein the guiding blades are integrally formed with the hub.

8. The heat-dissipating mechanism for a motor as claimed in claim 1, wherein the separation ribs are integrally formed with the hub.

9. The heat-dissipating mechanism for a motor as claimed in claim 1, wherein the hub and the casing are shaped as a cylindrical profile.

10. The heat-dissipating mechanism for a motor as claimed in claim 1, wherein the motor is a DC motor.

11. The heat-dissipating mechanism for a motor as claimed in claim 1, wherein the heat-dissipating mechanism further comprises a plurality of blades connected to the hub.

12. The heat-dissipating mechanism for a motor as claimed in claim 11, wherein the blades are obliquely extended from a side wall of the hub, respectively.

13. The heat-dissipating mechanism for a motor as claimed in claim 11, wherein the blades comprise centrifugal blades.

14. The heat-dissipating mechanism for a motor as claimed in claim 11, wherein the blades comprise axial-flow blades.

15. The heat-dissipating mechanism for a motor as claimed in claim 11, further comprising a fan frame surrounding the hub and the blades.

16. The heat-dissipating mechanism for a motor as claimed in claim 1, further comprising a fan frame comprising a plurality of inclined elements disposed between the stator base and an inner wall thereof.

17. A heat-dissipating mechanism for a motor, comprising:
a fixed stator base; and
a rotatable outer rotor, comprising:
a casing comprising a cylindrical side portion, a bottom portion, at least one opening disposed at the bottom portion, and a rotating shaft formed on the bottom portion, wherein the rotatable outer rotor is rotated with respect to the fixed stator base by the rotating shaft thereof disposed in the fixed stator base; and
a hub directly mounted on the cylindrical side portion of the casing, comprising a cylindrical inner side surface and a plurality of separation ribs formed on the cylindrical inner side surface, wherein the separation ribs of the hub are contacted with the cylindrical side portion of the casing and a heat-dissipating passage is therefore formed between every two adjacent separation ribs and the cylindrical side portion of the casing when the casing and the hub are assembled.

18. The heat-dissipating mechanism for a motor as claimed in claim 17, wherein the hub and the casing are rotated together with respect to the fixed stator base.

19. An axial-flow fan, comprising:
a motor;
a fan frame used as a fixed part for the motor, comprising a plurality of inclined elements; and
a heat-dissipating mechanism, comprising:
a stator base disposed in the fan frame;
an outer rotor used as a rotatable part for the motor and disposed in the stator base, comprising:
a casing comprising a cylindrical side portion, a bottom portion, at least one opening disposed at the bottom portion, and a rotating shaft formed on the bottom portion, wherein the outer rotor is rotated with respect to the stator base by the rotating shaft thereof disposed in the stator base; and
a hub directly mounted around the cylindrical side portion of the casing, comprising a cylindrical inner side surface and a plurality of separation ribs formed on the cylindrical inner side surface, wherein the separation ribs of the hub are contacted with the cylindrical side portion of the casing and a heat-dissipating passage is formed between every two adjacent separation ribs and the cylindrical side portion of the casing when the casing and the hub are assembled.

20. The axial-flow fan as claimed in claim 19, wherein the hub and the casing of the outer rotor are rotated together with respect to the stator base or the fan frame.

* * * * *